United States Patent
Wang

(10) Patent No.: US 7,458,015 B2
(45) Date of Patent: Nov. 25, 2008

(54) ELECTRONIC DOCUMENT READING SYSTEM AND METHOD

(75) Inventor: Shengjin Wang, Tokyo (JP)

(73) Assignee: NEC Corporation, Tokyo (JP)

( * ) Notice: Subject to any disclaimer, the term of this patent is extended or adjusted under 35 U.S.C. 154(b) by 327 days.

(21) Appl. No.: 10/484,662

(22) PCT Filed: Dec. 12, 2002

(86) PCT No.: PCT/JP02/13024

§ 371 (c)(1), (2), (4) Date: Aug. 19, 2004

(87) PCT Pub. No.: WO03/054708

PCT Pub. Date: Jul. 3, 2003

(65) Prior Publication Data

US 2004/0268221 A1 Dec. 30, 2004

(30) Foreign Application Priority Data

Dec. 12, 2001 (JP) .............................. 2001-377987

(51) Int. Cl.
G06F 15/00 (2006.01)
G06F 17/00 (2006.01)
(52) U.S. Cl. ...................... 715/229; 715/234; 715/238; 715/242
(58) Field of Classification Search ................. 715/526, 715/530, 531
See application file for complete search history.

(56) References Cited

U.S. PATENT DOCUMENTS

| | | | | |
|---|---|---|---|---|
| 5,519,438 | A | * | 5/1996 | Elliott et al. ................. 348/180 |
| 6,008,847 | A | * | 12/1999 | Bauchspies ............ 375/240.01 |
| 6,070,195 | A | | 5/2000 | Yamamoto |
| 6,192,393 | B1 | | 2/2001 | Tarintino et al. |
| 6,243,392 | B1 | | 6/2001 | Uemura et al. |
| 6,665,841 | B1 | | 12/2003 | Mahoney et al. |
| 2002/0003576 | A1 | * | 1/2002 | Konishi et al. .............. 348/232 |
| 2002/0073122 | A1 | * | 6/2002 | Iwata et al. ................. 707/525 |
| 2003/0050952 | A1 | * | 3/2003 | Yamamoto ..................... 709/1 |

FOREIGN PATENT DOCUMENTS

| | | |
|---|---|---|
| JP | 7-152668 | 6/1995 |
| JP | 7-319899 | 12/1995 |
| JP | 9-231121 | 9/1997 |
| JP | 10-124430 | 5/1998 |
| JP | 11-86014 | 3/1999 |
| JP | 11-205786 | 7/1999 |
| JP | 11-242654 | 9/1999 |

(Continued)

Primary Examiner—Doug Hutton
Assistant Examiner—Nathan Hillery
(74) Attorney, Agent, or Firm—Scully, Scott, Murphy & Presser, P.C.

(57) ABSTRACT

A document is divided into a plurality of regions so that each page has a meaning and, for each of the regions, there is generated a similarity table indicating a similarity degree and a data amount corresponding to the multiplexed resolution level data. By referencing this similarity table, each page of the electronic document in the region specified by the user is represented by a predetermined similarity (resolution) and at the reading speed specified by the user. Moreover, by referencing the similarity table, each page of the electronic document is represented at the maximum speed while guaranteeing the predetermined similarity.

11 Claims, 8 Drawing Sheets

FOREIGN PATENT DOCUMENTS

| | | |
|---|---|---|
| JP | 2000-50261 | 2/2000 |
| JP | 2000-82066 | 3/2000 |
| JP | 2001-22675 | 1/2001 |
| JP | 2001-53619 | 2/2001 |
| JP | 2001-69502 | 3/2001 |
| JP | 2001-148802 | 5/2001 |

* cited by examiner

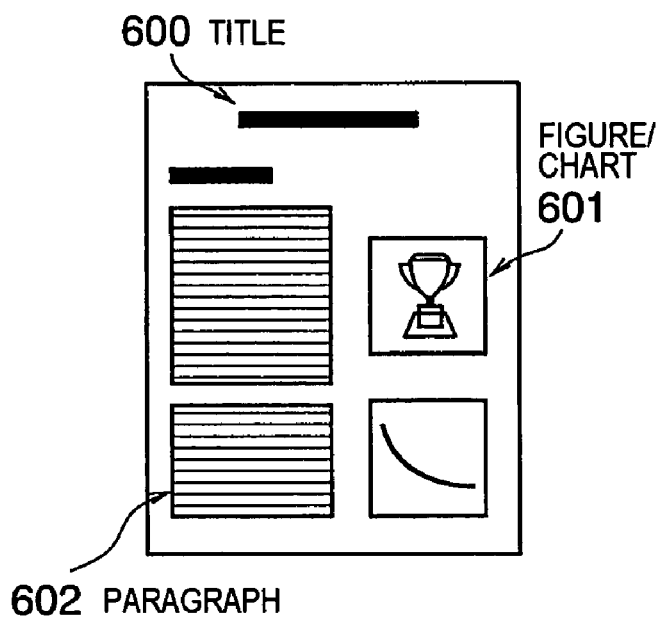
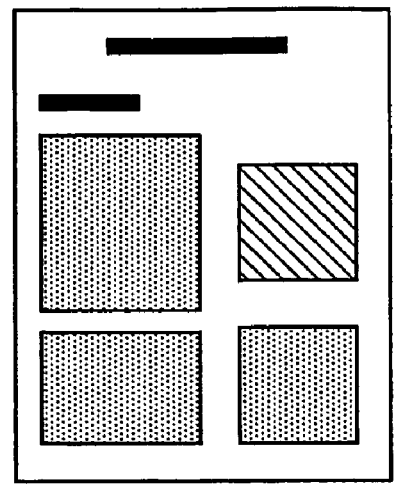
FIG. 4A      FIG. 4B
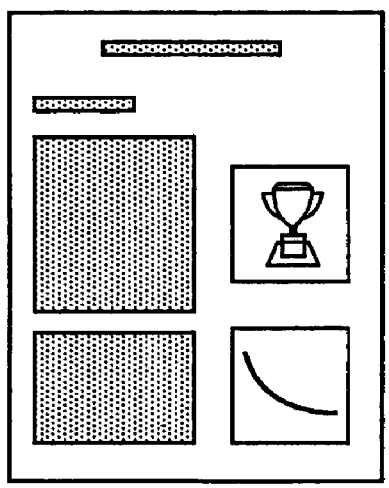
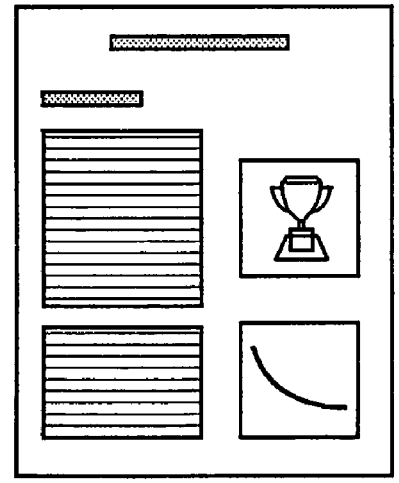
FIG. 4C      FIG. 4D

SIMILARITY TABLE

| PATTERN & AREA | RESOLUTION LEVEL | SIMILARITY | AMOUNT OF DATA |
|---|---|---|---|
| TITLE AREA 1 (x1,y1),(x2,y2) | 6<br>5<br>4<br>3<br>2<br>1<br>0 | 1.0<br>0.98<br>0.95<br>0.91<br>0.8<br>0.7<br>0.6 | 10K<br>5K<br>2K<br>1K<br>0.5K<br>0.2K<br>0.1K |
| TITLE AREA 2 (x3,y3),(x4,y4) | 6<br>5<br>4<br>3<br>2<br>1<br>0 | 1.0<br>0.98<br>0.95<br>0.91<br>0.8<br>0.7<br>0.6 | 10K<br>5K<br>2K<br>1K<br>0.5K<br>0.2K<br>0.1K |
| FIGURE AREA (x5,y5),(x6,y6) | 6<br>5<br>4<br>3<br>2<br>1<br>0 | 1.0<br>0.98<br>0.95<br>0.91<br>0.8<br>0.7<br>0.6 | 100K<br>50K<br>20K<br>10K<br>4.5K<br>2K<br>1K |
| CHART AREA (x7,y7),(x8,y8) | 6<br>5<br>4<br>3<br>2<br>1<br>0 | 1.0<br>0.95<br>0.91<br>0.8<br>0.7<br>0.6<br>0.5 | 100K<br>50K<br>20K<br>10K<br>4.5K<br>2K<br>1K |
| PARAGRAPH AREA 1 (x9,y9),(x10,y10) | 6<br>5<br>4<br>3<br>2<br>1<br>0 | 1.0<br>0.95<br>0.92<br>0.8<br>0.7<br>0.6<br>0.5 | 100K<br>50K<br>20K<br>10K<br>4.5K<br>2K<br>1K |
| PARAGRAPH AREA 2 (x11,y11),(x12,y12) | 6<br>5<br>4<br>3<br>2<br>1<br>0 | 1.0<br>0.95<br>0.92<br>0.8<br>0.7<br>0.6<br>0.5 | 100K<br>50K<br>20K<br>10K<br>4.5K<br>2K<br>1K |
| 1 PAGE (x0,y0),(x13,y13) (DEFAULT) | 6<br>5<br>4<br>3<br>2<br>1<br>0 | 1.0<br>0.95<br>0.92<br>0.8<br>0.7<br>0.6<br>0.5 | 450K<br>220K<br>100K<br>50K<br>20K<br>10K<br>5K |

FIG. 5

ELECTRONIC DOCUMENT READING SYSTEM AND METHOD

TECHNICAL FIELD

The present invention relates to electronic documents viewing systems and methods therefor. In particular, the present invention relates to an electronic-document viewing system and a method for viewing a large amount of electronic documents, such as electronic magazines, newspapers, and in-house documents.

BACKGROUND ART

With the advancement of information technology, information of magazines, newspapers, in-house documents, and the like are digitized to provide image data, which is then stored in electronic document files on electronic document servers. In order to view electronic document images (hereinafter simply referred to as "electronic documents") stored on the electronic document servers, images are generally displayed on display screens at user terminals via various communication networks, including LAN (Local Area Network) and WAN (Wide Area Network).

As a method for transmitting images in such cases, a progressive (progressive) transmission technique is commonly used. With the progressive transmission technology, during the transmission of an image, the image is displayed gradually sharper (by gradually increasing the resolution) through several steps.

Relevant technologies using such a progressive transmission technique will be described with reference to particular documents.

Japanese Unexamined Patent Publication (JP-A) No. 2000-50261 (hereinafter referred to as "Patent Document 1") discloses the following technology. A user specifies an important area in an image in advance. An image specified as an important area is transmitted prior to the images of areas other than the important area.

Japanese Unexamined Patent Publication (JP-A) No. 11-242654 (hereinafter referred to as "Patent Document 2") discloses the following technology. A document image (document image) specified by a user is separately transmitted at two-stage resolutions through the use of a layout structure in the document. That is, a layout structure in the document image is identified and a layout object that is more likely to be referred to by the user is transmitted to the user terminal at a high resolution. On the other hand, a layout object that is less likely to be referred to by the user is transmitted to the user terminal at a low resolution.

Japanese Unexamined Patent Publication (JP-A) No. 2001-148802 (hereinafter referred to as "Patent Document 3") discloses the following technology. In order to prevent transfer failure of image data due to battery depletion of a digital camera, the up-time based on a battery remaining capacity is determined. Based on the determined up-time and a data transmission speed, a file size (the amount of data) that can be transmitted is determined. The resolution level of the image file is determined in accordance with the determined transmittable file size and the image is transmitted at the determined resolution level.

Electronic documents to be viewed in an electronic-document viewing system include not only individual electronic documents and electronic magazines but also a group of search-result's electronic documents that are found through keyword searching. Since the amount of data for an electronic document is enormous, much time is required to download the entire electronic document to a user terminal. In general, users wish to check what are contents of electronic documents they are receiving like or where desired contents exist, as quickly as possible. That is, in the electronic-document viewing system, it is required that necessary electronic documents be downloaded as quickly as possible while minimizing inconvenience to the users.

For example, in the technology disclosed in Document 1, image information of the user-specified important area is progressively transmitted prior to image information of the other areas. This technology, however, cannot control the resolution level of the entire areas including the important area and the other areas.

While the technology disclosed in Document 2 utilizes a layout structure of a document, a layout object is transmitted and displayed at fixed high and low resolutions. Thus, depending on a layout object included in a document image, transmission time becomes uneven, i.e., it may take a long period of time or short period of time for transmission. This imparts an unpleasant feeling to the user and can be a cause of stress.

In addition, in the technology disclosed in Document 3, the up-time is determined from a remaining battery capacity and an image is transmitted at a resolution level in accordance with the determined up-time. Thus, for example, a specific area and a viewing speed according to user's preferences cannot be specified, so that this technology has a drawback in that various viewing modes cannot be controlled based on a user's selection.

The problems of the technologies disclosed in Documents 1 to 3 described above are attributed to a point that a user's viewing speed (e.g., a page-turning speed) is not considered at all. Thus, all of the technologies have problems in that they provide an unpleasant feeling to users and cause inconvenience to the users.

Additionally, all of the technologies described above have a problem in that it is impossible to smoothly turn pages at a constant page-turning speed while ensuring the quality of an area of user interest. Further, the transmission speed of a network varies depending on, for example, the type of network. Yet, no consideration is given to ensuring a viewing condition set by a user even for a varied transmission speed.

Accordingly, an object of the present invention is to provide an electronic-document viewing system and a method which allow for comfortable document viewing without imparting an unpleasant feeling to a user.

Another object of the present invention is to provide an electronic-document viewing system and a method which allow for smooth page turning at a constant page-turning speed while ensuring the quality of an area of user interest.

Still another object of the present invention is to provide an electronic-document viewing system and a method which can ensure a viewing condition set by a user, even when the transmission speed of a data transmission network varies.

DISCLOSURE OF INVENTION

An electronic-document viewing system according to the present invention is an electronic-document viewing system that allows viewing of an electronic document stored in a file in response to a viewing request from a user through a communication network.

According to an aspect of the present invention, the electronic-document viewing system includes a document analyzing section for digitizing a document to be viewed and for analyzing the structure of a layout of the electronic document for each page thereof, a table generating section for generating a table including, at least, different resolution levels and amounts of data corresponding to the respective resolution levels, so as to correspond to images of each area included in the layout for each page, a calculating section for calculating, in response to the viewing request including a specified speed-priority mode in which a viewing speed is specified, an amount of data and transmission time per page based on a transmission speed of the communication network and the viewing speed, and a controlling section for determining resolution levels corresponding to the determined amount of data by referring to the table and for giving an image page corresponding to the determined resolution level to the user during the transmission time.

An electronic-document viewing system according to another aspect of the present invention includes a document analyzing section for digitizing a document to be viewed and for analyzing the structure of a layout of the electronic document for each page thereof, a table generating section for generating a table including different resolution levels, similarities relative to the original image of images with the resolution levels, and amounts of data, so as to correspond to the images of each area included in the layout for each page, and a controlling section for determining, in response to the viewing request including a specified similarity-priority mode in which a specific similarity for a page to be viewed is ensured, each area's resolution level corresponding to a resolution that is equal to or larger than the specific similarity and that is closest to the specific similarly by referring to the table and for giving an image page corresponding to the determined resolution level to the user during the transmission time.

An electronic-document viewing method according to the present invention is an electronic-document viewing method that allows viewing of an electronic document stored in a file in response to a viewing request from a user through a communication network.

According to an aspect of the present invention, the electronic-document viewing method includes a step of digitizing a document to be viewed and of analyzing the structure of a layout of the electronic document for each page thereof, a step of generating a table including, at least, different resolution levels and amounts of data corresponding to the respective resolution levels, so as to correspond to images of each area included in the layout for each page, a step of calculating, in response to the viewing request including a specified speed-priority mode in which a viewing speed is specified, an amount of data and transmission time per page based on a transmission speed of the communication network and the viewing speed, and a controlling step of determining a resolution level corresponding to the determined amount of data by referring to the table and of giving an image page corresponding to the determined resolution level to the user during the transmission time.

An electronic-document viewing method according to another aspect of the present invention includes a step of digitizing a document to be viewed and of analyzing the structure of a layout of the electronic document for each page thereof, a step of generating a table including different resolution levels, similarities relative to the original image of images with the resolution levels, and amounts of data, so as to correspond to the images of each area included in the layout for each page, and a controlling step of determining, in response to the viewing request including a specified similarity-priority mode in which a specific similarity for a page to be viewed is ensured, each area's resolution level corresponding to a resolution that is equal to or larger than the specific similarity and that is closest to the specific similarly by referring to the table and of giving an image page corresponding to the determined resolution level to the user during the transmission time.

The present invention provides the following effects. A document is divided into meaningful areas (significant areas) for each page, and a similarity table is created. In the similarity table, similarities, the amount of data, and the like which correspond to data having multi-resolution levels for each area are indicated. This similarity table is used to set resolutions so that a user can receive the each area of the electronic document at a user's specified viewing speed while the transmission speed of a communication network is considered. When an area of user interest is set, with respect to the area, transmission is performed at a resolution that allows user's viewing. With respect to other areas, a resolution is set so that the user's viewing speed is ensured while the transmission speed of the communication network is considered.

Performing such control can provide a comfortable electronic-document viewing environment without imparting an unpleasant feeling to the user.

BRIEF DESCRIPTION OF THE DRAWINGS

FIGS. 4A to 4D are views showing examples of a page layout and examples of a displayed page which correspond to viewing modes;

FIG. 5 is shows an example of a similarity table corresponding to the page layout shown in FIGS. 4A to 4D;

BEST MODE FOR CARRYING OUT THE INVENTION

Figure 1:
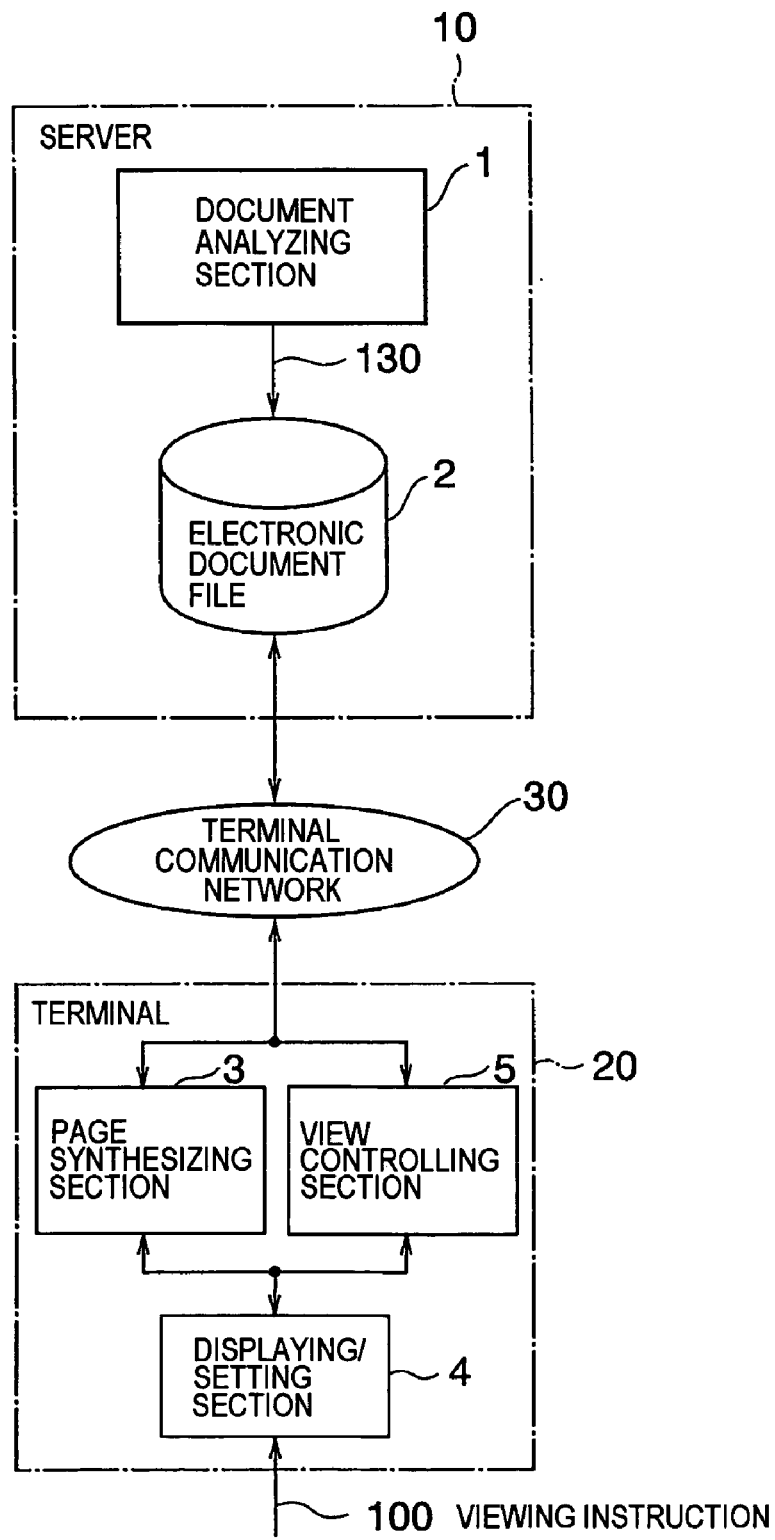
FIG. 1 is a block diagram schematically showing the configuration of an embodiment of an electronic-document viewing system according to the present invention.

An embodiment of the present invention will be described below in detail with reference to the drawings. FIG. 1 is a block diagram schematically showing the configuration of an embodiment of an electronic-document viewing system according to the present invention.

In FIG. 1, a server 10 and a user terminal 20 are interconnected over a communication network 30. The server 10 includes a document analyzing section 1 and an electronic document file 2. The document analyzing section 1 digitizes a document and the like and analyzes the features and structure thereof for each page, thereby creating a similarity table, which will be described later. The electronic document file 2 stores electronic document information 130, which includes electronic document data and the similarity table obtained by the document analyzing section 1.

The user terminal 20 includes a page synthesizing section 3, a displaying/setting section 4, and a view controlling section 5. The page synthesizing section 3 decodes data in accordance with stream data transmitted from the electronic document file 2 of the server 10 and progressively synthesizes an electronic document page. Upon receiving images divided for respective areas of an electronic document from the server 10, the page synthesizing section 3 synthesizes an image from the images divided for the respective areas.

The displaying/setting section 4 receives a user's viewing instruction 100 and displays the image synthesized by the page synthesizing section 3. The displaying/setting section 4 realizes an interface to the user. The displaying/setting section 4 also allows the user to give the viewing instruction 100, including viewing mode selection and/or a viewing speed, which will be described later.

The view controlling section 5 reads similarity-table stream data transmitted from the electronic document file 2 of the server 10. The view controlling section 5 also controls access of data between the user terminal 20 and the server 10 in accordance with content of the similarity table, the transmission speed of the communication network 30, and content of the user's viewing instruction 100 input via the displaying/setting section 4.

Figure 2:
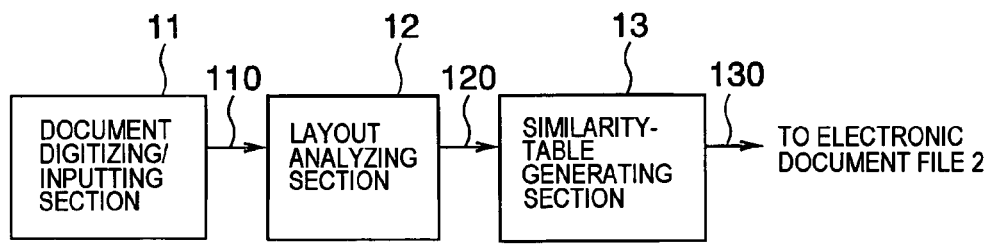
FIG. 2 is a block diagram showing the details of the document analyzing section shown in FIG. 1.

FIG. 2 shows the internal configuration of the document analyzing section 1. In FIG. 2, the document analyzing section 1 includes a document digitizing/inputting section 11, a layout analyzing section 12, and a similarity-table generating section 13.

The document digitizing/inputting section 11 digitizes a document or the like and compresses and encodes the digitized image data. With respect to a pre-digitized document, such as an HTML document, the document digitizing/inputting section 11 compresses and encodes the document, as image data. In the present embodiment, the document is output as image data 110, such as JPEG or JPEG2000 data, to the layout analyzing section 12.

The layout analyzing section 12 performs a layout analysis on the image data 110 sent from the document digitizing/inputting section 11 to provide layout information 120.

The similarity-table generating section 13 divides the image data 110 into a plurality of significant areas, in accordance with the layout information 120 sent from the layout analyzing section 12. Further, for each divided area, the similarity-table generating section 13 calculates similarities between images having different resolutions and the corresponding original image and the amounts of data of the images having different resolutions, thereby creating a similarity table 130. In the case of multi-layer structures, images that are composed of different layers and that have different resolutions are also included. The similarity table 130 will be described in detail later.

Figure 3:
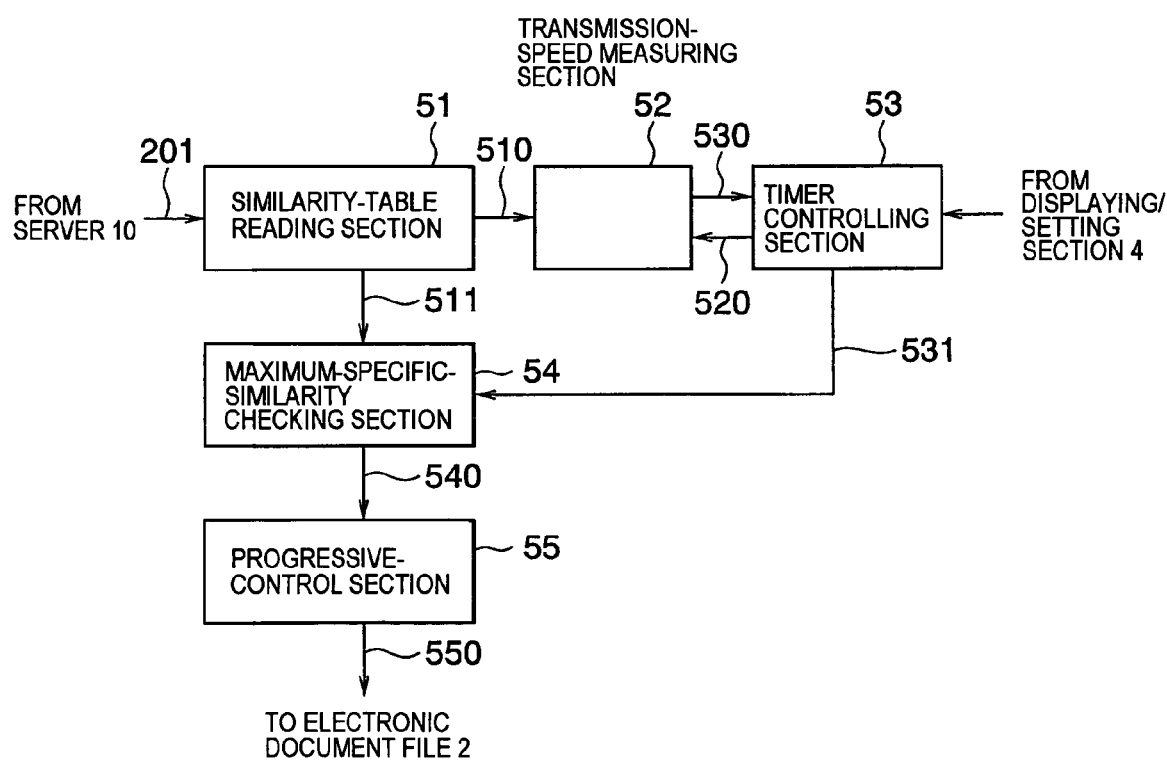
FIG. 3 is a block diagram showing the details of the view controlling section 5 shown in FIG. 1.

FIG. 3 shows the internal configuration of the view controlling section 5 of the user terminal 20. In FIG. 3, the view controlling section 5 includes a similarity-table reading section 51, a transmission speed measuring section 52, a timer controlling section 53, and a maximum-specific-similarity checking section 54, and a progressive-control section 55.

The similarity-table reading section 51 reads stream data 201 of the similarity table from electronic document file 2 of the server 10. The similarity-table reading section 51 outputs obtained similarity tables 510 and 511

The transmission speed measuring section 52 determines a transmission speed 530 corresponding to transmission time per page to be viewed, based on the similarity table 510 provided by the similarity-table reading section 51, a user-specified viewing speed 520, and the transmission speed of the communication network 30.

Based on the determined transmission speed 530 and the viewing speed that is set by the user and that is input via the displaying/setting section 4, the timer controlling section 53 determines page display information 531 for controlling time for viewing (page-turning).

Based on the page display information 531 and the similarity table 511, the maximum-specific-similarity checking section 54 creates page control information 540 for changing the resolution of an electronic document so as to allow viewing at the viewing speed specified by the user. Based on the page display information 531 and the similarity table 511, the maximum-specific-similarity checking section 54 can also create page control information 540 for changing the resolution of an electronic document such that the viewing speed reaches its maximum speed, while ensuring the user-specified resolution.

Based on the page control information 540, the progressive-control section 55 transmits an image data request 550 to the server 10. The image data request 550 serves as an image viewing request and includes, at least, resolution level information. The progressive-control section 55 also transmits to the server 10 the image data request 550 that includes a resolution level changed by user input or the like as needed.

The server 10 receives the image data request 550 through the communication network 30, and sends an image file (electronic document) that corresponds to the image data request. At this point, the server 10 refers to the resolution level in the image data request 550 and sends an image file that corresponds to the resolution level to the user terminal 20.

The page synthesizing section 3 of the user terminal 20 receives the image file from the server 10 and gives an instruction for displaying the image file via the displaying/setting section 4. When the image file has been divided into individual areas, the page synthesizing section 3 synthesizes the image file from the divided image areas and gives an instruction for displaying the synthesized image file via the displaying/setting section 4.

The layout information 120 resulting from the analysis by the layout analyzing section 12 and the similarity table 130 generated by the similarity-table generating section 13 with respect to the layout information 120 will now be described with reference to FIGS. 4A to 4D and FIG. 5.

FIG. 4A shows layout-structure examples of a page. In the present embodiment, the document digitizing/inputting section 11 scans a document printed on paper to digitize the document, thereby creating the image data 110 in JPEG2000 format. The electronic document data is stored in the electronic document file 2.

In the example of FIG. 4A, an electronic document is divided into a plurality of areas. Areas denoted by reference numeral 600 represent title areas. In this example, two title areas are shown. Areas denoted by reference numeral 601 represent figure/chart areas. The upper area therein is a figure area and the lower area is a chart area. Further, reference numeral 602 represents character-string paragraph areas, which constituted by two areas.

The layout analyzing section 12 analyzes a layout by performing a layer analysis and creates the layout information 120. The layout information generated thereby is information indicated by "Pattern & Area" in a table shown in FIG. 5, in which the name and the coordinates of each area are shown. A known technology is used as the layout analysis technology. For example, the technology discussed in Japanese Unexamined Patent Publication (JP-A) No. 07-192083 can be utilized.

FIGS. 4B to 4D are schematic views showing how the electronic document shown in FIG. 4A is displayed at a terminal.

FIG. 4B shows an example displayed when areas of user interest are the title areas in a speed priority mode. FIG. 4C shows an example displayed when an area of user interest is the figure/chart area in a speed priority mode. FIG. 4D shows an example in a similarity priority mode.

FIG. 5 shows an example of the similarity table 130 created by the similarity-table generating section 13 using the layout information 120, which is obtained by the analysis of the electronic document shown in FIG. 4A by the layout analyzing section 12.

In the similarity table, each area in FIG. 4A is represented by a set of area coordinates indicating the position (within the page) of each area and a resolution level with which the similarity and the amount of its data (the size of stream data) are associated. Here, for example, with regard to title area 1, the area coordinates are represented by two points, i.e., coordinates (x1, y1) and coordinates (x2, y2). One of the two points represents, for example, the upper left corner of the four corners defining the area, and the other point represents the lower right corner. The term "similarity" refers to information indicating a similar degree relative to the original electronic document stored on the server 10. In this example, the maximum of the similarity is 1.0, which indicates that the resolution is the same as the resolution of the original electronic document. As the numeric value of the similarity decreases, the resolution (similarity) decreases.

(Description of Operation at Server 10)

Next, the operation of the embodiment of the present invention will be described in detail with reference to flow charts.

Figure 6:
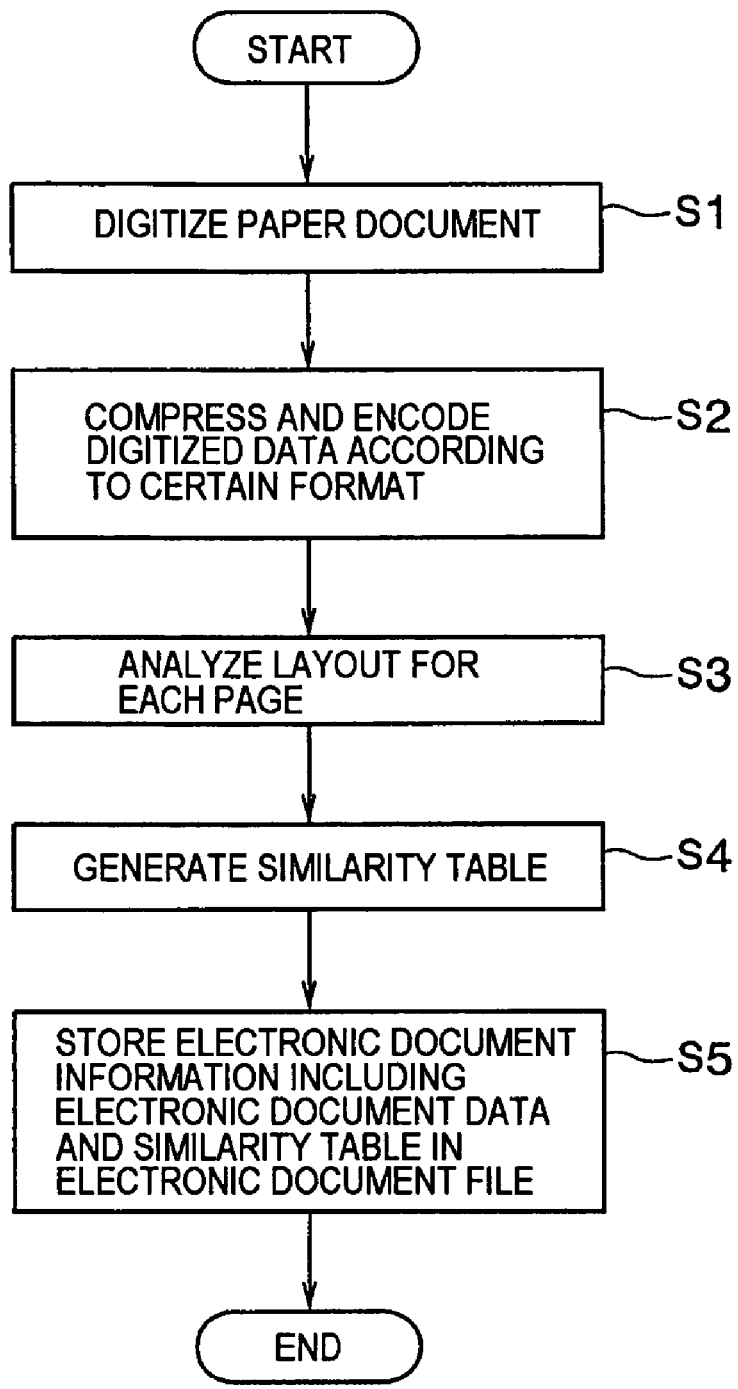
FIG. 6 is a flow chart for illustrating the operation of the document analyzing section shown in FIG. 1.

FIG. 6 is a flow chart illustrating the operation of the document analyzing section 1 shown in FIG. 1.

First, the document digitizing/inputting section 11 creates digitized data of a paper document using an apparatus such as a scanner (step S1). Thereafter, the document digitizing/inputting section 11 compresses and encodes the digitized data in accordance with a certain format such as a JPEG2000 format (step S2), and outputs the resulting data to the layout analyzing section 12 as the image data 110.

Using the image data 110, the layout analyzing section 12 performs a layout analysis for each page (step S3). In the case of this example, this page is constituted by the areas including two document titles 600, one figure and one chart 601, and two character-string paragraphs 602, as shown in FIG. 4A.

Based on the layout information 120, the similarity-table generating section 13 sets similarities between level 0, which is the minimum resolution, and level 6, which is the maximum resolution (in an example in JPEG2000 format), and generates the similarity table 130.

In the example of the electronic document shown in FIG. 4A, suppose that the similarity table shown in FIG. 5 is generated. In this case, the amount of data of each area corresponding to the individual resolution level is also indicated in the corresponding set in the table (step S4).

In the example of FIG. 5, three types of similarities are shown in the similarity table. The title areas and the figure area show the same similarity value if the resolution levels are the same, but which merely shows one example. For example, the same similarity value may be used for all the areas, or the similarity value may be varied for each area. For example, in the case of a figure area, even with a certain degree of a low resolution level, when the similarity value is set to high, an image of the figure area can be displayed without much change from the original image. On the other hand, if the similarity value is set to low, it can be expected that the amount of data is reduced.

The similarity-table generating section 13 receives the image data 110 to also create image data (electronic document data) corresponding to the respective resolution levels of each area. For example, from the figure represented by the figure/chart 601 in FIG. 4A, the similarity-table generating section 13 creates a total of seven types of image data (electronic document data) having seven steps of resolutions from resolution level 0 to level 6. The image of an individual area for each resolution level is stored in the electronic document file 2.

An example in which the similarity-table generating section 13 does not create image data corresponding to the resolution level of each area is also possible. For example, upon receipt of a viewing request for an area of the electronic document from the user terminal 20, an image is generated in accordance with a resolution level included in the viewing request and the generated image is sent to the user terminal 20. In this case, an advantage exists in that the capacity of the electronic document file 2 can be reduced.

The electronic document data and the similarity table 130 which are obtained in this manner are stored in the electronic document file 2 (step S5).

(Description of Overall Operation)

Now, a description is given of condition setting at the time of viewing at the user terminal 20. In this embodiment, a "speed priority mode", in which a page-turning speed (viewing speed) is maintained constant, and a "similarity priority mode", in which the similarity (resolution) is maintained constant, are available as viewing modes. The user can set the viewing mode via the displaying/setting section 4.

In the speed priority mode, it is necessary to specify the viewing speed. When the viewing speed is specified, for example, "1 page/second", "3 pages/second", or the like can be specified. In this example, the user specifies the viewing speed via the displaying/setting section 4.

In the speed priority mode, it is also possible to specify an area (specific area) in which the use has an interest. Via the displaying/setting section 4, the user specifies, for example, the title areas, figure/chart area, paragraph areas, other areas, or a combination of these areas. Specifying the specific area allows the page turning of the specified specific area at a specified viewing speed while a predetermined specific similarity is being maintained. A case in which a condition in which the specific area (default) is not set is also available. In such a case, similarities for all the areas are equally treated.

Next, a description is given of the "specific similarity" described above and a "maximum specific similarity" used below.

First, definitions as follows are given. Similarity 1.0 means that the original area image and an area image in question completely match each other. A similarity value closer to 1.0 indicates that the degree of matching with the original image is higher. Also, a smaller similarity value indicates that the degree of matching is lower.

Even with the similarity value other than 1.0, the sense of human sight allows for identification of the original content when the similarity value is at a certain threshold value or larger. In general, the threshold value can be determined by visual testing, but can also be specified by the user. The term "specific similarity" represents the threshold value.

On the other hand, even at the same resolution level, the similarities for different types of areas do not necessarily become the same. Referring to FIG. 5, when the resolutions levels are 3, the similarities for the title areas indicate 0.91, whereas the similarity for the chart area indicates 0.8. That is, when the specific similarities are compared with each other, the resolutions levels are not necessary the same value.

A case in which an electronic document stored on the server is viewed through the communication network will now be described. When a communication network environment in which the original electronic document (image data) can be transmitted such that user's viewing speed is slower than the transmission state of the communication network, the user can view the electronic document without surplus and shortage. However, if the transmission state of the communication network cannot deal with the user's viewing speed, the user's viewing must be stopped until the downloading of the electronic document stored on the server onto the user terminal is completed.

In the present invention, the similarities of the electronic document (image data) are varied in accordance with the transmission state of the communication network and/or the use's viewing speed. However, depending on the transmission state of the communication network, when a resolution level is set to a level for the specific similarity or a higher level, the amount of the image data may exceed the transmission speed of the communication network, making it impossible to deal with the user's viewing speed.

In this case, in the present embodiment, a maximum specific similarity is set which ensures the user's viewing speed and which makes the best use of the transmission speed of the communication network. In this case, further, a certain area in the electronic document may be received with the resolution for a specific similarly or a higher resolution and the maximum specific similarity may be set for the other areas.

The maximum specific similarity refers to a resolution level that satisfies a user's viewing speed and that makes the best use of the communication network when an electronic document cannot be transmitted with a resolution level for the specific similarity or a higher resolution level.

The present invention also provides a mode in which an electronic document can be viewed with a resolution for the specific similarity or a higher resolution even if the viewing speed is somewhat sacrificed. This mode will be referred to as a "similarity priority mode" in the present embodiment.

In the example described below, suppose that the value of the "specific similarity" is set to "0.9".

Figure 7:
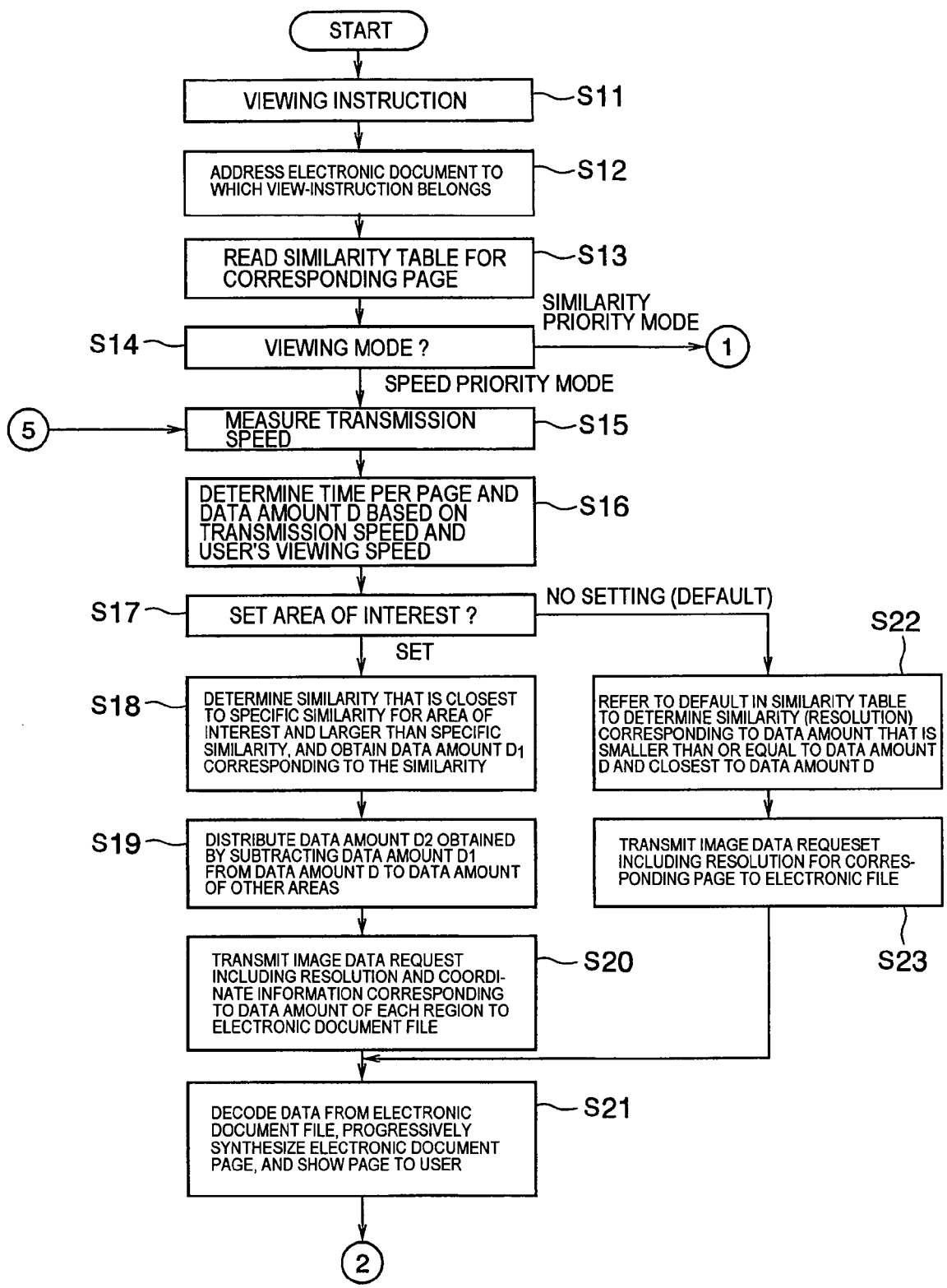
FIG. 7 is a flow chart for illustrating part of the operation of the embodiment of the present invention.
Figure 8:
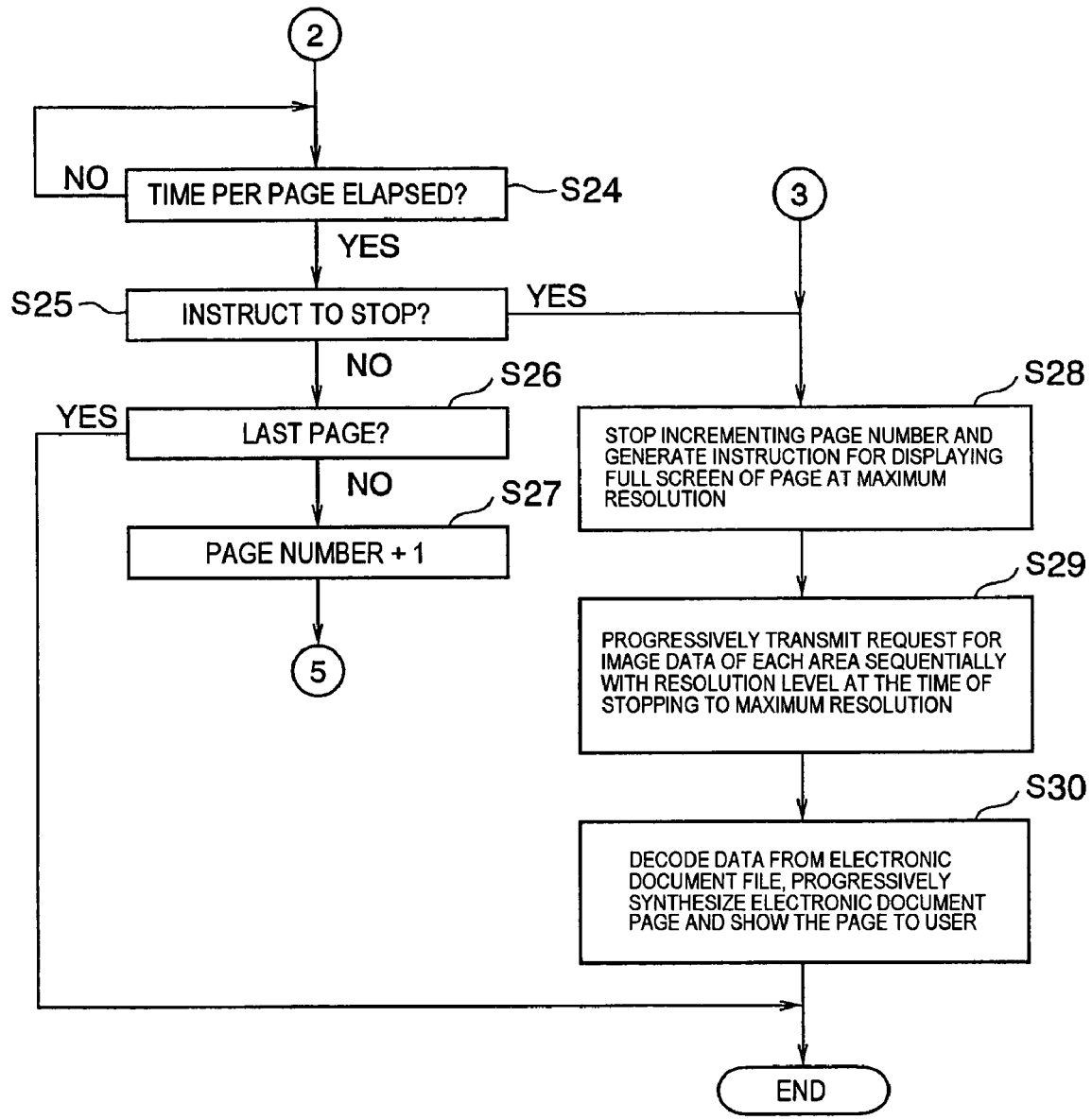
FIG. 8 is a flow chart for illustrating part, which follows FIG. 7, of the operation of the embodiment of the present invention.

Next, an operation in a speed priority mode will be described in detail with reference to FIGS. 7 and 8.

A first operation at the time of viewing will now be described. First, suppose that the user at the displaying/setting section 4 sets the viewing mode to the "speed priority mode", sets the viewing speed to "3 pages/second", and sets areas of interest to the "title area". The user then enters the viewing instruction 100 in the displaying/setting section 4 (step S11). When the present invention is applied to the WWW (World Wide Web), the user's viewing instruction 100 may be given by a method for directly specifying the URL (Uniform Resource Locator) of an electronic document that the user wishes to view or a method for presenting a user-viewable electronic document to the user for selection. Naturally, various other methods are possible.

When the viewing instruction 100 is input from the user via the displaying/setting section 4, the viewing instruction is input to the timer controlling section 53 of the view controlling section 5. The view controlling section 5 transmits to the server 10 an instruction for connecting the user terminal 20 and the server 10, via the communication network 30.

In the present embodiment, in response to the user's viewing instruction from the user terminal 20, the server 10 transmits an electronic document list stored in the electronic document file 2 to the user terminal 20. Upon receiving the list from the server 10, the user terminal 20 displays the list via the page synthesizing section 3 and the displaying/setting section 4. The user selects one electronic document in which he or she has an interest from the electronic document list and presses a viewing button (flipping-through button), so that the user can start viewing of the electronic document.

A description is now given of the operation of the view controlling section 5 for displaying, after the start of viewing, a new page having the similarity table shown in FIG. 5.

The timer controlling section 53 transmits the location, i.e., the URL (Uniform Resource Locator), of an electronic document to which the new page belongs and its page number (for example, "1") to the server 10 (step S12). When a plurality of electronic-document images do not exist, the page number is not necessary required.

The similarity-table reading section 51 reads the stream data 201 of the similarity table for the electronic document from the server 10 (step S13). The viewing mode in this case is the speed priority mode (step S14). Thus, the transmission speed measuring section 52 determines the transmission speed (step S15). The transmission speed measuring section 52 in this example determines the transmission speed 530, based on the transmission speed of the communication network 30 and the user-specified viewing speed 520. The transmission speed of the communication network 30 can be readily determined from the similarity table input from the server 10 via the similarity-table reading section 51 and/or an electronic document actually transmitted from the server.

For example, suppose that the transmission speed measuring section 52 has determined the transmission speed of the communication network 30 to be 64 Kbps (bps=bit per second). In this case, based on the transmission speed "64 Kbps" of the communication network and the user-specified viewing speed "3 pages/second", the transmission speed measuring section 52 determines about 0.33 second of time (communication time) per page and about 21.3 Kb as the amount D of data for the time (step S16). That is, the transmission speed measuring section 52 measures a transmission speed per page.

In this embodiment, suppose that the transmission speed is measured for each page. For example, even when the transmission speed of the communication network varies from 64 Kbps to 32 Kbps, the viewing speed can be ensured by increased/reduced time and the amount of data (in this case, about 10.7 Kb) allotted to one page.

The maximum-specific-similarity checking section 54 checks with the maximum specific similarity for the tile areas specified by the user as areas of interest (step S17), based on the page-data amount D of 21.3 Kb and the similarity table shown in FIG. 5.

Algorithms for checking the maximum specific similarity in this case will be described below. In two title areas 1 and 2 shown in FIG. 5, a similarity that is larger than the specific similarity 0.9 and that is closest to 0.9 is searched for in decreasing order of the similarity values.

For title areas 1 and 2, FIG. 5 indicates that a value of 0.91 corresponds to the similarity. The amount of stream data corresponding to 0.91 is 1 Kb and the amount D1 of data is expressed by the following equation:

$$D1 = 1\ Kb + 1\ Kb = 2\ Kb < 21.3\ Kb$$

As a result, a resolution level of 3 can be determined (step S18).

The resolution levels for the other four areas (the figure area, chart area, paragraph area 1, and paragraph area 2) are further determined through the use of the following equation:

$D−D1=21.3\text{ Kb}−2\text{ Kb}=19.3\text{ Kb}$

This is determined based on the amount of stream data from a higher similarity value to a lower similarity value.

When the resolution level is 6, the amounts of stream data of the other four areas are 100 Kb, 100 Kb, 100 Kb, and 100 Kb, respectively, so that the amount D2 of data is expressed as follows:

$$D2 = 100\text{ Kb} + 100\text{ Kb} + 100\text{ Kb} + 100\text{ Kb}$$
$$400\text{ Kb}$$

In this case, since the amount of stream data is larger than 19.3 Kb, the data cannot be transmitted at resolution level 6. Similarly, calculations are performed for resolution level 5 to resolution level 0.

In the case of this example, when the resolution level is 2, the amount of stream data of each of the four areas is 4.5 Kb and the amount D2 of data is expressed as follows:

$$D2 = 4.5\text{ Kb} + 4.5\text{ Kb} + 4.5\text{ Kb} + 4.5\text{ Kb}$$
$$19\text{ Kb} < 19.3\text{ Kb}$$

Thus, resolution level 2 is determined.

What is indicated by the above-described algorithms is that it is sufficient when even a smaller amount of data satisfies the specific similarity for an area of user interest, and the remainder as a result thereof is distributed to the other areas (step S19).

This allows a highest resolution screen to be displayed while ensuring a viewing speed specified by the user, which is one feature of the present invention.

From the above result, the progressive-control section 55 sets the resolutions of the two title areas to resolution level 3 and sets the resolutions of the other four areas to resolution level 2. The image data request 550, which includes information regarding the resolution level of each area and the coordinate information, is transmitted to the server 10 (step S20).

In accordance with stream data 200 transmitted from the sever 10, the page synthesizing section 3 decodes data and progressively synthesizes an electronic document page. The displaying/setting section 4 displays a page image 300 synthesized by the page synthesizing section 3 (step S21). The schematic diagram of the displayed image is shown in FIG. 4B. FIG. 4B shows an example in which the title areas are set as areas of interest. While no description is given, a case in which the figure/chart area is set as an area of interest is displayed as shown in FIG. 4C. That is, for an area set as an area of interest, an area image that satisfies the specific resolution is obtained, and for the other areas, the similarities (resolutions) are set while the transmission speed and viewing speed are considered.

At the same time, a display status 400 is sent from the displaying/setting section 4 to the timer controlling section 53. After the elapse of 0.33 second of time (step S24 in FIG. 8), when no stopping instruction is input and when the page is not the last page, the timer controlling section 53 increments the page number by "1" (steps S25, S26, and S27), and sends an instruction for switching to the next new page. When an instruction for stopping page-turning is not input from the user, the process returns to step S15, in which the above-described processes are repeated.

In the above-described example, the tile areas are set as specific areas in which the user has an interest. Similar processes are executed for a case in which other areas are specified. In step S17 in the flow chart shown in FIG. 7, when an area of interest (default) is not set, a default section shown in the bottom row in the table of FIG. 5 is referred to. Then, the similarity (resolution) in the default section that is less than or equal to the amount D of per-page data determined in step S16 and that corresponds to an amount of data closest to the amount D of data is selected (step S22). In the case of this example, since the amount of page data is 21.3 Kb, resolution level 2 is selected with reference to FIG. 5. An image data request including this resolution level is transmitted to the server 10 (step S23). The subsequent processes are performed from step S21.

Figure 9:
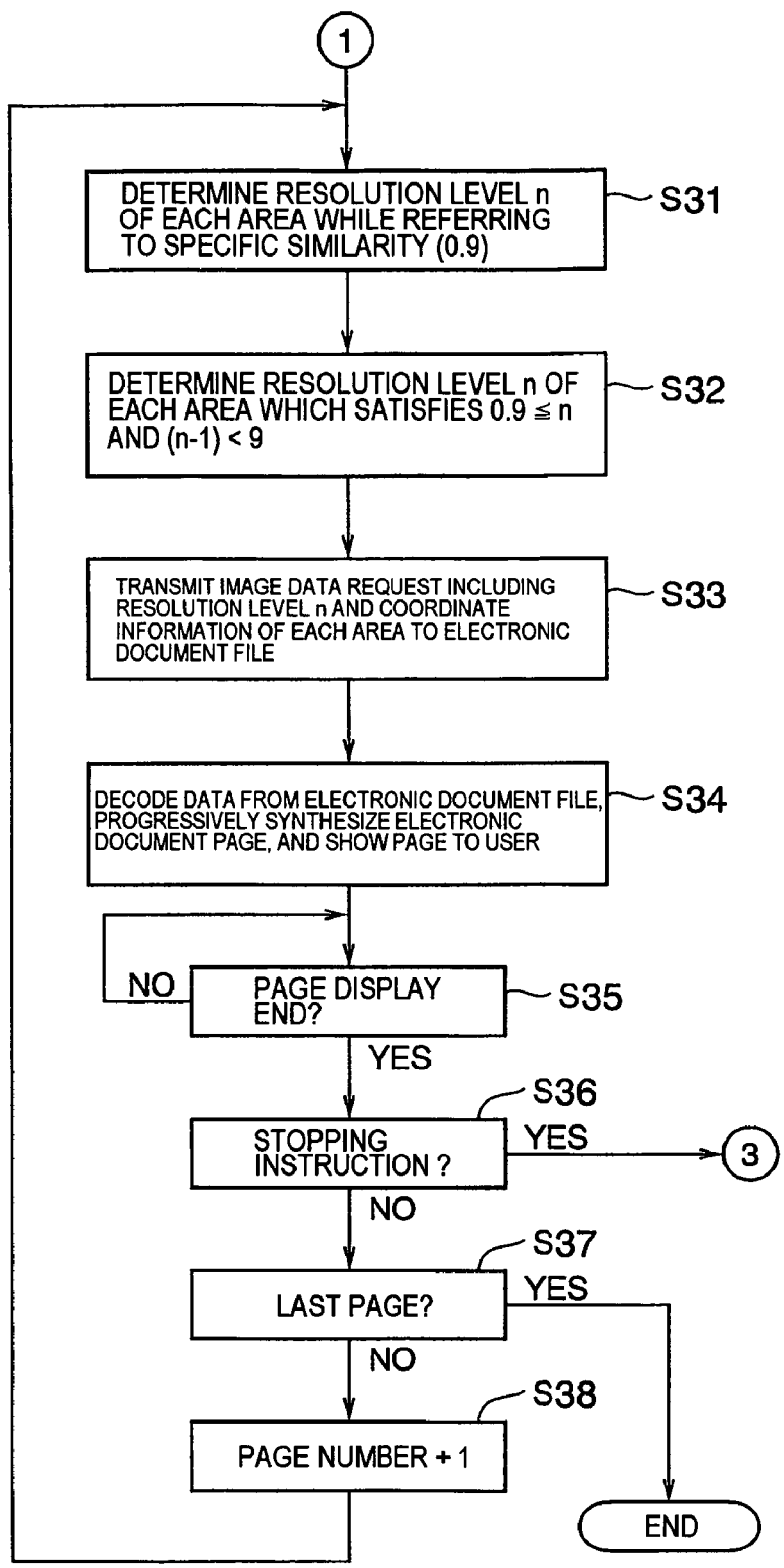
FIG. 9 is a flow chart for illustrating part, which follows FIG. 7, of the operation of the embodiment of the present invention.

Next, in step S14, an operation when the viewing mode is set to the similarity priority mode will be described with reference to the flowchart shown in FIG. 9.

Here, suppose that the user sets the viewing mode at the displaying/setting section 4 to the "similarity priority mode" and sets an area of interest to "default (no area of interest is set)". A first operation at the time of this viewing is analogous to the first operation at the time of viewing in the speed priority mode, and thus steps S11 to S14 in FIG. 7 are executed. While checking with specific similarity "0.9" to the fullest extent, the maximum-specific-similarity checking section 54 determines the resolution level of each area (step S31).

An algorithm for checking in this case will be described. For six areas shown in FIG. 5, resolution level n is determined while each similarity is being checked in decreasing order of the similarity values. Resolution level n satisfies the following definition (step S32).

$0.9 \leq$ similarity value for resolution level n similarity value for resolution level $n-1 < 0.9$ From FIG. 5, resolution level n that satisfies the above conditions is determined to be "3" for the two title areas, "3" for the figure area, "4" for the chart area, and "4" for the two paragraph areas.

The progressive-control section 55 transmits the resolution level information and coordinate information that are thus obtained for each area to the server 10 (step S33). The page synthesizing section 3 decodes data in accordance with the stream data 200 from the server 10 and progressively synthesizes an electronic document page. The displaying/setting section 4 displays the page image 300 synthesized by the page synthesizing section 3 (step S34). The displayed image is shown in FIG. 4D.

Simultaneously, the display status 400 is sent from the displaying/setting section 4 to the timer controlling section 53. When an instruction for stopping page-turning is not input from the user (step S36) and when the page is not the last page (step S37), the timer controlling section 53 increments the page number by "1" in order to repeat the processes described above, and sends an instruction for switching to the next new page (step S38).

In each operation described above, examples of the case in which the page turning is stopped include a case in which a page reaches the last page (the first page in the case of reverse-page turning) and a case in which the user requests an instruction for stopping page-turning when he or she wishes to read a certain page in detail. In such cases, the timer controlling section 53 sends an instruction for not incrementing the page number and an instruction for displaying the full screen of the page at up to its maximum resolution (step S28 in FIG. 8).

Based on the resolution information for the previous page that has already been transmitted, the progressive-control section 55 progressively requests the server 10 to transmit stream data of the remaining portion.

For example, when page turning is stopped in the speed priority mode, since the resolutions of the title areas are at resolution level 3, continuously, the image data request 550 for resolution levels 4 to 6 for the same areas are progressively transmitted to the server 10. Further, for the four areas having resolution level 2, the image data request 550 for resolution levels 3, 4, 5 and 6 are progressively sent to the server 10.

Based on the stream data 200 transmitted from the server 10, the page synthesizing section 3 decodes data to progressively synthesize the electronic document page. The displaying/setting section 4 displays the full-screen page image 300 having its maximum resolution (step S30). The displayed image is shown in FIG. 4A.

The system configuration shown in FIG. 1 is illustrated as merely an example, and thus the present invention is not limited thereto. For example, the view controlling section 5 may be provided at the server 10 or the page synthesizing section 3 may also be provided at the server 10.

INDUSTRIAL APPLICABILITY

An electronic-document viewing system according to the present invention is particularly suitable for an electronic-document viewing system for viewing a large amount of electronic documents, including digitized magazines, newspapers, and in-house documents. For viewing a large amount of electronic documents stored on a server on a communication network, the electronic-document viewing system monitors the speed of a communication line so that the electronic documents can be displayed at a page-turning speed set according to a user's preference. This allows smooth switching of page screens and provides more comfortable viewing environment. Thus, the electronic-document viewing system does not impart an unpleasant feeling and stress to the user at the time of viewing, unlike the conventional systems.

The electronic-document viewing system according to the present invention also divides an digitized document into significant areas and creates a similarity table corresponding to multi-resolution data of each area. The use of the similarity table allows the selection of the order of areas during document transmission to correspond to an area in which the user has an interest. As a result, it is possible to overcome the conventional drawbacks in that areas need to be manually specified and the order of the areas needs to be fixed.

In addition, even when the speed of the communication line varies, in a speed priority mode, the electronic-document viewing system according to the present invention can adjust the amount of data allotted for each page in an adaptive manner, and for an area in which the user has an interest, the electronic-document viewing system can display the electronic document with a maximum specific similarity at a specified speed. In a similarity priority mode, on the other hand, for an area in which the user has an interest, the electronic-document viewing system can display the electronic document at its maximum speed while ensuring a specific similarity.

The invention claimed is:

1. A terminal apparatus for an electronic-document viewing system that allows viewing of an electronic document stored on a server in response to a viewing request from a terminal through a communication network, the terminal apparatus comprising:

means for selecting a resolution level of the electronic document based on, at least, a transmission speed of the communication network;

means for receiving the electronic document containing data matching the viewing request based on a similarity table generated by the server, the similarity table being generated for each electronic document stored on the server and containing, for each pattern and area of the electronic document, at least information regarding resolution level, similarity between the resolution level and original pattern or area and amount of data of the pattern or area at each resolution level; and means for giving the viewing request for the electronic document at the selected resolution level.

2. The terminal apparatus for the electronic-document viewing system according to claim 1, wherein the server stores the electronic document as a plurality of electronic documents each at a unique resolution level.

3. A terminal apparatus for an electronic-document viewing system that allows viewing of an electronic document stored on a server in response to a viewing request from a terminal through a communication network, the terminal apparatus comprising:

means for selecting a resolution level of the electronic document based on, at least, a user's viewing speed of the electronic document;

means for receiving the electronic document containing data matching the viewing request based on a similarity table generated by the server, the similarity table being generated for each electronic document stored on the server and containing, for each pattern and area of the electronic document, at least information regarding resolution level, similarity between the resolution level and original pattern or area and amount of data of the pattern or area at each resolution level; and means for giving the viewing request for the electronic document at the selected resolution level.

4. The terminal apparatus for the electronic-document viewing system according to claim 3, wherein the server stores the electronic document as a plurality of electronic documents each at a unique resolution level.

5. A terminal apparatus for an electronic-document viewing system that allows viewing of an electronic document stored on a server in response to a viewing request from a terminal through a communication network, wherein the server analyzes a layout structure of the electronic document to divide the electronic document into a plurality of areas and stores the plurality of areas, the terminal apparatus comprising:

means for selecting resolution levels of the divided areas based on at least one of a transmission speed of the communication network and a user's viewing speed of the electronic document;

means for giving the viewing request for the electronic document at the selected resolution levels;

means for synthesizing the electronic document input based on the viewing request; and means for receiving the electronic document containing data matching the viewing request based on a similarity table generated by the server, the similarity table being generated for each electronic document stored on the server and containing, for each pattern and area of the electronic document, at least information regarding resolution level, similarity between the resolution level and original pattern or area and amount of data of the pattern or area at each resolution level.

6. The terminal apparatus for the electronic-document viewing system according to claim 5, further comprising: means for setting an area of interest in which the user has an interest out of the divided areas, wherein a resolution level required by the user is selected for the area set as the area of interest.

7. A terminal apparatus for an electronic-document viewing system that allows viewing of an electronic document stored on a server in response to a viewing request from a terminal through a communication network,
wherein the server analyzes a layout structure of the electronic document to divide the electronic document into a plurality of areas and stores each divided area at a plurality of resolution levels, the terminal apparatus comprising:
means for selecting resolution levels of the divided areas based on at least one of a transmission speed of the communication network and a user's viewing speed of the electronic document;
means for giving the viewing request for the electronic document at the selected resolution levels;
means for synthesizing the electronic document input based on the viewing request; and
means for receiving the electronic document containing data matching the viewing request based on a similarity table generated by the server, the similarity table being generated for each electronic document stored on the server and containing, for each pattern and area of the electronic document, at least information regarding resolution level, similarity between the resolution level and original pattern or area and amount of data of the pattern or area at each resolution level.

8. The terminal apparatus for the electronic-document viewing system according to claim 7, further comprising: means for setting an area of interest in which the user has an interest out of the divided areas, wherein a resolution level required by the user is selected for the area set as the area of interest.

9. A computer readable medium embodying a program executable by a terminal apparatus for an electronic-document viewing system that allows viewing of an electronic document stored on a server in response to a viewing request from a terminal through a communication network, the program comprising:
a first step of selecting a resolution level of the electronic document based on at least one of a transmission speed of the communication network and a user's viewing speed of the electronic document;
a second step of giving the viewing request for the electronic document at the resolution level selected in the first step; and
a third step of receiving the electronic document containing data matching the viewing request based on a similarity table generated by the server, the similarity table being generated for each electronic document stored on the server and containing, for each pattern and area of the electronic document, at least information regarding resolution level. similarity between the resolution level and original pattern or area and amount of data of the pattern or area at each resolution level.

10. A computer readable medium embodying a program executable by a terminal apparatus for an electronic-document viewing system that allows viewing of an electronic document stored on a server in response to a viewing request from a terminal through a communication network, wherein the server analyzes a layout structure of the electronic document to divide the electronic document into a plurality of areas and stores the plurality of areas, the program comprising:
a first step of selecting resolution levels of the divided areas based on at least one of a transmission speed of the communication network and a user's viewing speed of the electronic document;
a second step of giving the viewing request for the electronic document at the selected resolution levels;
a third step of synthesizing the electronic document input based on the viewing request; and
a third step of receiving the electronic document containing data matching the viewing request based on a similarity table generated by the server, the similarity table being generated for each electronic document stored on the server and containing, for each pattern and area of the electronic document, at least information regarding resolution level, similarity between the resolution level and original pattern or area and amount of data of the pattern or area at each resolution level.

11. A computer readable medium embodying a program executable by a terminal apparatus for an electronic-document viewing system that allows viewing of an electronic document stored on a server in response to a viewing request from a terminal through a communication network, wherein the server analyzes a layout structure of the electronic document to divide the electronic document into a plurality of areas and stores each divided area at a plurality of resolution levels, the program comprising:
a first step of selecting resolution levels of the divided areas based on at least one of a transmission speed of the communication network and a user's viewing speed of the electronic document;
a second step of giving the viewing request for the electronic document at the resolution levels selected in the first step;
a third step of synthesizing the electronic document input based on the viewing request; and
a third step of receiving the electronic document containing data matching the viewing request based on a similarity table generated by the server, the similarity table being generated for each electronic document stored on the server and containing, for each pattern and area of the electronic document, at least information regarding resolution level, similarity between the resolution level and original pattern or area and amount of data of the pattern or area at each resolution level.

* * * * *